United States Patent [19] [11] 3,894,020
Maurer et al. [45] July 8, 1975

[54] 3,4,-DIHYDRO-4-OXO-QUINAZOLIN(3)-YL-(THIONO)-PHOSPHORIC (PHOSPHONIC) ACID ESTERS

[75] Inventors: Fritz Maurer; Hans-Jochem Riebel; Lothar Rohe, all of Wuppertal; Wolfgang Behrenz; Ingeborg Hammann, both of Loeln; Wilhelm Stendel, Wuppertal, all of Germany

[73] Assignee: Bayer Aktiengesellschaft, Leverkusen, Germany

[22] Filed: May 2, 1973

[21] Appl. No.: 356,646

[30] Foreign Application Priority Data
May 10, 1972 Germany............. 2223025

[52] U.S. Cl....260/251 P; 260/251 QA; 260/256.4 E; 260/256.5 R; 424/200
[51] Int. Cl............................................ C07d 51/48
[58] Field of Search................................ 260/251 P

[56] References Cited
UNITED STATES PATENTS
3,226,387  12/1965  Newbold et al.................... 260/251

OTHER PUBLICATIONS
Nakanishi et al., C.A. 71, 39003u (1969), Abstract of Jap. Patent 8508/69.

Primary Examiner—Donald G. Daus
Assistant Examiner—Raymond V. Rush
Attorney, Agent, or Firm—Burgess, Dinklage & Sprung

[57] ABSTRACT 3,4-dihydro-4-oxo-quinazolin(3)-yl-(thiono)-phosphoric (phosphonic) acid esters of the formula

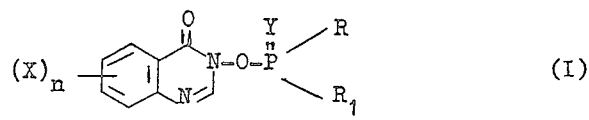

in which
R is alkoxy with 1 to 6 carbon atoms or dialkylamino with 1 to 6 carbon atoms in each alkyl moiety,
$R_1$ is alkyl, alkoxy, alkylmercapto or monoalkylamino with 1 to 6 carbon atoms or dialkylamino with 1 to 6 carbon atoms in each alkyl moiety, or phenyl,
X is hydrogen or halogen,
Y is oxygen or sulfur, and
n is an integer from 1 to 4,
which possess insecticidal and acaricidal properties.

7 Claims, No Drawings

3,4-DIHYDRO-4-OXO-QUINAZOLIN(3)-YL-(THIONO)-PHOSPHORIC (PHOSPHONIC) ACID ESTERS

The present invention relates to and has for its objects the provision of particular new 3,4-dihydro-4-oxo-quinazolin(3)-yl-(thiono)-phosphoric (phosphonic) acid esters which are optionally halogen-substituted on the benzene ring, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from published Japanese Patent Application 8508/69 that O,O-dialkyl-O-[2-alkyl-3,4-dihydro-4-oxo-quinazolin(3)-yl]-thionophosphoric acid esters, for example O,O-diethyl-O-[2-methyl-3,4-dihydro-4-oxo-quinazolin(3)-yl]-thionophosphoric acid ester (Compound A), possess insecticidal properties. It is furthermore known from published Netherlands Pat. application 6,704,838 that 2,4-dioxo-1,3-benzoxazinothionophosphoric acid esters, for example O,O-diethyl-O-[2,4-dioxo-benzoxazin(3)-yl]-thionophosphoric acid ester (Compound B), are distinguished by an insecticidal activity.

The present invention provides 3,4-dihydro-4-oxo-quinazolino(thiono)-phosphoric(phosphonic) acid esters or ester amides of the general formula

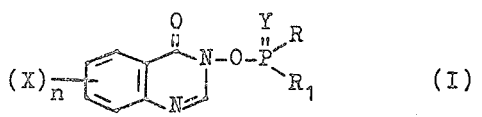

in which
R is alkoxy with 1 to 6 carbon atoms or dialkylamino with 1 to 6 carbon atoms in each alkyl moiety,
$R_1$ is alkyl, alkoxy, alkylmercapto or monoalkylamino with 1 to 6 carbon atoms or dialkylamino with 1 to 6 carbon atoms in each alkyl moiety, or phenyl,
X is hydrogen or halogen,
Y is oxygen or sulfur, and
n is an integer from 1 to 4.

Preferably, R is lower alkoxy with 1 to 4 carbon atoms or di-lower alkylamino with 1 to 3 carbon atoms in each alkyl moiety, $R_1$ is lower alkyl, alkoxy, alkylmercapto or monoalkylamino with 1 to 4 carbon atoms, or di-lower alkylamino with 1 to 3 carbon atoms in each alkyl moiety, or phenyl.

Surprisingly, the 3,4-dihydro-4-oxo-quinazolino(thiono)-phosphoric(phosphonic) acid esters or ester-amides according to the invention are distinguished by a broader insecticidal and acaricidal action than the previously known compounds of analogous structure and of the same type of action. The new products can be employed successfully against hygiene pests and/or in the veterinary medicine field against animal parasites (ectoparasites), for example parasitic fly larvae. The compounds according to the invention thus represent a genuine enrichment of the art. They furthermore contribute to satisfying the great demand for constantly new active compounds in the field of pesticides. The latter arises from the fact that the commercially available agents have to meet constantly higher requirements, especially with regard to questions of protection of the environment, such as low toxicity to warm-blooded animals and low phytotoxicity, rapid degradation in and on the plant with short minimum intervals to be observed between spraying with pesticide and harvesting, and activity against resistant pests. Thus inter alia in the veterinary medicine field blowfly larvae have over the course of the years become resistant, in various areas, against the phosphoric acid ester derivatives and carbamates hitherto employed as pesticides, so that in many areas they are combated with only doubtful success. To ensure economical raising of animals in the areas of infestation there is therefore a requirement for agents with which, for example, blowfly larvae (even of resistant strains), such as of the genus Lucilia, can be combated reliably. For example, the Goondiwindi strain of *Lucilia cuprina* has become highly resistant towards the phosphoric acid ester derivatives and carbamates hitherto used. The active compounds according to the invention, however, act both against the normally sensitive and against the resistant strains of blowfly larvae.

The invention also provides a process for the production of a 3,4-dihydro-4-oxo-quinazolino(thiono)-phosphoric (phosphonic) acid ester or ester-amide of the formula (I) in which a 3,4-dihydro-3-hydroxy-4-oxo-quinazoline derivative of the general formula

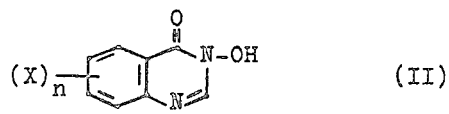

is reacted, in the form of an alkali metal salt, alkaline earth metal salt or ammonium salt or in the presence of an acid-binding agent, with a (thiono)-phosphoric(-phosphonic) acid ester halide or ester-amide halide or diamide halide of the general formula

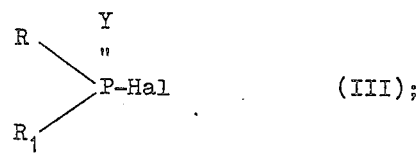

in which formulae
R, $R_1$, X, Y and n have the abovementioned meanings and Hal is halogen, preferably chlorine.

If, for example, 3,4-dihydro-3-hydroxy-4-oxo-quinazoline and O,O-diethylthionophosphoric acid ester chloride are used as starting materials, the course of the reaction according to the invention can be represented by the following formula scheme:

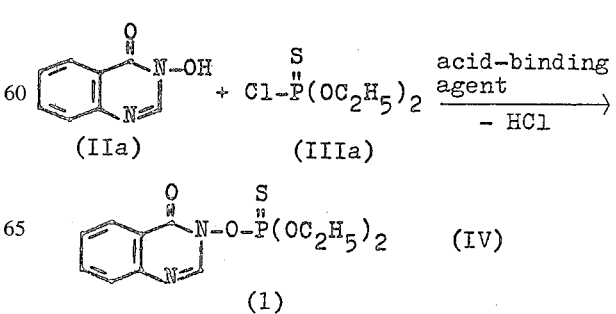

The following may be mentioned as specific examples of (thiono)phosphoric(phosphonic) acid ester halides or esteramide halides or diamide halides (III) to be employed in the process: O,O-dimethyl-, O,O-diethyl-, O,O-di-n-propyl-, O,O-di-iso-propyl-, O,O-di-n-butyl-, O,O-di-iso-butyl-, O,O-di-sec.-butyl-, O,O-di-tert.-butyl-, O-methyl-O-ethyl- and O-ethyl-O-iso-propylphospshoric acid ester chloride and the corresponding thiono analogues; O-methyl-, O-ethyl-, O-n-propyl-, O-iso-propyl-, O-n-butyl-, O-sec.-butyl-, O-iso-butyl- and O-tert.-butyl-methane- or -ethane-, -n-propane-, -iso-propane-, -butane- and -benzene-phosphonic acid ester chloride and the corresponding thiono analogues; O-methyl-, O-ethyl-, O-n-propyl-, O-iso-propyl-, O-n-butyl-, O-iso-butyl-, O-sec.-butyl- and O-tert.-butyl-N-methyl- or -N-ethyl-, -N-n-propyl-, -N-iso-propyl-phosphoric acid ester amide chloride and the corresponding thiono analogues; bis-(dimethyl-, diethyl-, di-n-propyl- and di-iso-propyl-amido)-phosphoric acid diamide chloride and the corresponding thiono analogues; and O,S-dimethyl-, O,S-diethyl-, O,S-di-n-propyl-, O,S-di-iso-propyl-, O,S-di-n-butyl-, O,S-di-iso-butyl-, O,S-di-sec.-butyl-, O,S-di-tert.-butyl-, O-methyl-S-ethyl-, O-ethyl-S-methyl-, O-ethyl-S-n-propyl- and O-ethyl-S-iso-propyl-thiolophosphoric acid ester chloride and the corresponding thiono analogues.

The (thiono)-phosphoric(phosphonic) acid ester halides or ester-amide halides or diamide halides (III) and 3,4-dihydro-3-hydroxy-4-oxo-quinazoline derivatives (II) to be used as starting compounds are known from the literature and can be prepared according to customary methods.

The reaction according to the invention for the preparation of the new 3,4-dihydro-4-oxo-quinazolino(thiono)-phosphoric(phosphonic) acid esters or ester-amides (I) is preferably carried out in the presence of a diluent. As such it is possible to use practically all inert organic solvents. These in particular include aliphatic and aromatic optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, such as acetone, methyl ethyl ketone, methyl ispropyl ketone and methyl isobutyl ketone; and nitriles, for example acetonitrile and propionitrile.

All customary acid-binding agents can be used in the process. Alkali metal carbonates and alcoholates, such as sodium and potassium carbonate, methylate, ethylate and tert.-butylate, have proved particularly successful, as have aliphatic, aromatic or heterocyclic amines, for example triethylamine, dimethylaniline, dimethylbenzylamine and pyridine.

The reaction temperatures can be varied over a wide range. In general, the reaction is carried at −10° to +80°, preferably at 20° to 70°C.

The reaction is in general allowed to take place under normal pressure.

In general, the starting compounds may be employed in equimolar ratio. An excess of one or the other reactant seems to produce no significant advantages.

The reaction is in general carried out in a suitable solvent in the presence of an acid acceptor and thereafter the reaction mixture may be stirred for several hours. Following this, the mixture may be poured into water and worked up in accordance with customary methods.

Many of the new compounds are obtained in a crystalline form and can be characterized by their melting points. Others are obtained as oils and can be characterized by their refractive indexes.

As has already been mentioned, the 3,4-dihydro-4-oxo-quinazolino(thiono)-phosphoric(phosphonic) acid esters and ester-amides according to the invention are distinguished by excellent insecticidal and acaricidal activity towards plant pests and hygiene pests. While being of low phytotoxicity, they possess a good action both against sucking and against biting insects and mites (Acarina). For this reason, the compounds according to the invention may be successfully employed as pesticides in plant protection both in the hygiene field and in the veterinary field.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus phum solanifolii*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpiller (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutdenia flexivitta;* further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxyx calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus = Panonychus ulmi*), gall mites, for example the black-currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

As ectoparasites of animals there may be mentioned, from the class of the insects, the Diptera larvae which are parasitic in warm-blooded animals, such as *Lucilia sericata* or *Lucilia cuprina* (sensitive and resistant strains), *Chrysomya chloropyga* and larvae of warble flies, for example the cattle warble fly, *Hypoderma bovis*.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible acitve agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dipping, and the like.

It will be realized, of course, that the concentration of the particular active compound utilized in admixture with the carrier vehicle will depend upon the intended application. Therefore, in special cases it is possible to go above or below the aformentioned concentration ranges.

The synthesis, unexpected superiority and outstanding activity of the particular new compounds of the present invention are illustrated, without limitation, by the following examples. In Examples 4, 5 and 6, the relationship between parts by weight and by volume is the same as that between grams and milliliters.

EXAMPLE 1

Myzus test (contact action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from Table 1.

Table 1

(Myzus test)

| Active compound | Concentration of active compound in % by weight | Degree of destruction in % after 1 day |
| --- | --- | --- |
| (known) (B) | 0.1 | 20 |
| (known) (A) | 0.1 | 60 |
| | 0.01 | 0 |
| (1) | 0.1 | 100 |
| | 0.01 | 100 |
| | 0.001 | 90 |
| (11) | 0.1 | 100 |
| | 0.01 | 100 |
| | 0.001 | 60 |

Table 1 (continued)

(Myzus test)

| Active compound | Concentration of active compound in % by weight | Degree of destruction in % after 1 day |
|---|---|---|
| (6) quinazolinone-N-O-P(S)(OCH(CH$_3$)$_2$)$_2$ | 0.1<br>0.01<br>0.001 | 100<br>99<br>85 |
| (8) quinazolinone-N-O-P(S)(C$_2$H$_5$)(OCH$_3$) | 0.1<br>0.01 | 100<br>100 |
| (7) quinazolinone-N-O-P(S)(C$_2$H$_5$)(OC$_2$H$_5$) | 0.1<br>0.01 | 100<br>50 |
| (2) quinazolinone-N-O-P(S)(CH$_3$)(OCH(CH$_3$)$_2$) | 0.1<br>0.01 | 100<br>100 |
| (14) quinazolinone-N-O-P(S)(NH-CH(CH$_3$)$_2$)(OC$_2$H$_5$) | 0.1<br>0.01<br>0.001 | 100<br>99<br>55 |
| (5) quinazolinone-N-O-P(O)(N(CH$_3$)$_2$)$_2$ | 0.1<br>0.01<br>0.001 | 100<br>98<br>35 |
| (3) 6-Cl-quinazolinone-N-O-P(S)(OC$_2$H$_5$)$_2$ | 0.1<br>0.01 | 100<br>90 |
| (13) 6-Cl-quinazolinone-N-O-P(S)(C$_2$H$_5$)(OC$_2$H$_5$) | 0.1<br>0.01 | 100<br>70 |

EXAMPLE 2

Rhopalosiphum test (systemic action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Oat plants (*Avena sativa*) which had been strongly infested with the bird cherry aphid (*Rhopalosiphum padi*) were watered with the preparation of the active compound so that the preparation penetrated into the soil without wetting the leaves of the oat plants. The active compound was taken up by the oat plants from the soil and thus reached the infested leaves.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from Table 2.

Table 2

(Rhopalosiphum test / systemic action)

| Active compound | Concentration of active compound in % by weight | Degree of destruction in % after 4 days |
|---|---|---|
| 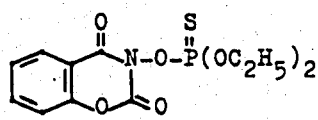 (known) (B) | 0.1 | 0 |
| 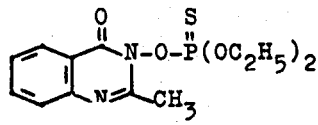 (known) (A) | 0.1 | 0 |
| 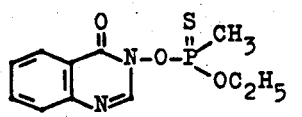 (9) | 0.1 | 100 |
| 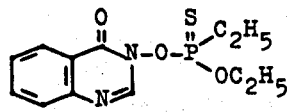 (7) | 0.1 | 100 |
| 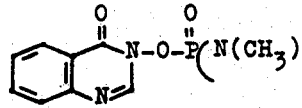 (5) | 0.1<br>0.01 | 100<br>90 |

EXAMPLE 3

Tetranychus test (resistant)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

Bean plants (*Phaseolus vulgaris*) which had a height of approximately 10 – 30 cm were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead animals. The degree of destruction thus obtained was expressed in %. 100% denotes that all spider mites were killed and 0% denotes that none of the spider mites were killed.

The active compounds, the concentrations of the active compounds, the evaluation times and the results can be seen from Table 3.

Table 3

(Tetranychus test / resistant)

| Active compound | Concentration of active compound in % by weight | Degree of destruction in % after 2 days |
|---|---|---|
| 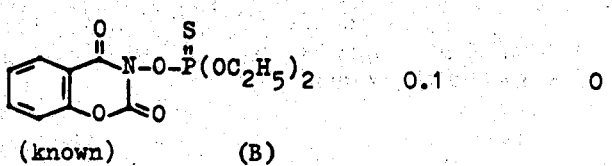 (known) (B) | 0.1 | 0 |

Table 3 (continued)

(Tetranychus test / resistant)

| Active compound | Concentration of active compound in % by weight | Degree of destruction in % after 2 days |
|---|---|---|
| (known) (A) — structure with $N-O-\overset{S}{\underset{\|}{P}}(OC_2H_5)_2$, quinoline with $=O$ and $CH_3$ | 0.1 | 0 |
| (11) — structure with $N-O-\overset{S}{\underset{\|}{P}}$ bearing $OC_2H_5$ and $OCH(CH_3)_2$ | 0.1 | 99 |
| (2) — structure with $N-O-\overset{S}{\underset{\|}{P}}$ bearing $CH_3$ and $OCH(CH_3)_2$ | 0.1 | 95 |

EXAMPLE 4

Mosquito larvae test
Test insects: *Aedes aegypti* larvae
Solvent: 99 parts by weight of acetone
Emulsifier: 1 part by weight of benzylhydroxydiphenyl polyglycol ether To produce a suitable preparation of active compound, 2 parts by weight of the active compound were dissolved in 1,000 parts by volume of the solvent containing the amount of emulsifier stated above. The solution thus obtained was diluted with water to the desired lower concentrations.

The aqueous preparations of the active compounds were placed in glass vessels and about 25 mosquito larvae were then placed in each glass vessel.

After 24 hours, the degree of destruction was determined as a percentage. 100% means that all the larvae were killed. 0% means that no larvae at all were killed.

The active compounds, the concentrations of the active compounds, the test animals and the results can be seen from Table 4.

Table 4

(Mosquito larvae test)

| Active compound | Active compound concentration of the solution in ppm | Degree of destruction in % |
|---|---|---|
| (known) (B) — phthalimide-type structure with $N-O-\overset{S}{\underset{\|}{P}}(OC_2H_5)_2$ | 10<br>1 | 100<br>0 |
| (known) (A) — quinazoline-type with $CH_3$, $N-O-\overset{S}{\underset{\|}{P}}(OC_2H_5)_2$ | 10<br>1 | 100<br>50 |
| (1) — quinazoline structure with $N-O-\overset{S}{\underset{\|}{P}}(OC_2H_5)_2$ | 10<br>1<br>0.1 | 100<br>100<br>50 |

Table 4 (continued)

(Mosquito larvae test)

| Active compound | Active compound concentration of the solution in ppm | Degree of destruction in % |
|---|---|---|
| Compound (6): isoquinoline derivative with N-O-P(=S)(OCH(CH$_3$)$_2$)$_2$ | 10<br>1<br>0.1 | 100<br>100<br>0 |
| Compound (15): isoquinoline derivative with N-O-P(=S)(OC$_2$H$_5$)(OC$_3$H$_7$-i) | 10<br>1<br>0.1 | 100<br>100<br>80 |
| Compound (22): 6-Cl isoquinoline derivative with N-O-P(=S)(OC$_2$H$_5$)$_2$ | 10<br>1<br>0.1 | 100<br>100<br>0 |

EXAMPLE 5

LT$_{100}$ test for Diptera
Test insects: *Aedes aegypti*
Solvent: Acetone 2 parts by weight of active compound were dissolved in 1,000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per m$^2$ of filter paper varied with the concentration of the solution of active compound used. About 25 test insects were then placed in the Petri dish and it was covered with a glass lid.

The condition of the test insects was continuously observed. The time which was necessary for a 100% destruction was determined.

The test insects the active compounds, the concentrations of the active compounds and the periods of time at which there was a 100% destruction can be seen from Table 5.

Table 5

(LT$_{100}$ test for Diptera / *Aedes aegypti*)

| Active compound | Active compound concentration of the solution in % (w/v) | LT$_{100}$ |
|---|---|---|
| (known) (B): benzo compound with CO-N-O-P(=S)(OC$_2$H$_5$)$_2$ and O-CO | 0.2 | 3 hrs = 40% |
| (known) (A): isoquinoline with CH$_3$ substituent, N-O-P(=S)(OC$_2$H$_5$)$_2$ | 0.2 | 3 hrs = 70% |

Table 5 (continued)

($LT_{100}$ test for Diptera / *Aedes aegypti*)

| Active compound | Active compound concentration of the solution in % (w/v) | $LT_{100}$ |
|---|---|---|
| (8) Isoquinoline-N-O-P(S)(OCH₃)(C₂H₅), =O | 0.2 / 0.02 | 120' / 180' |
| (9) Isoquinoline-N-O-P(S)(CH₃)(OC₂H₅), =O | 0.2 / 0.02 | 120' / 3 hrs = 90% |
| (15) Isoquinoline-N-O-P(S)(OC₂H₅)(OC₃H₇-i), =O | 0.2 / 0.02 | 120' / 180' |
| (22) 6-Cl-isoquinoline-N-O-P(S)(OC₂H₅)₂, =O | 0.2 / 0.02 / 0.002 | 60' / 120' / 3 hrs = 40% |

EXAMPLE 6

$LT_{100}$ test for Diptera
Test insects: *Musca domestica*
Solvent: Acetone 2 parts by weight of active compound were dissolved in 1,000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was continuously observed. The time which was necessary for a 100% knock down effect was determined.

The test insects, the active compounds, the concentrations of the active compounds and the periods of time at which there was a 100% knock down effect can be seen from Table 6.

Table 6

($LT_{100}$ test for Diptera / *Musca domestica*)

| Active compound | Active compound concentration of the solution in % (w/v) | $LT_{100}$ |
|---|---|---|
| (B) (known) benzo-fused CO-N(O-P(S)(OC₂H₅)₂)-O-CO | 0.2 | 6 hrs = 50% |
| (A) (known) 2-CH₃-isoquinoline-N-O-P(S)(OC₂H₅)₂, =O | 0.2 / 0.02 | 130' / 6 hrs |

Table 6 (continued)

($LT_{100}$ test for Diptera / *Musca domestica*)

| Active compound | Active compound concentration of the solution in % (w/v) | $LT_{100}$ |
|---|---|---|
| (1) Structure: quinazoline-N-O-P(=S)(OC$_2$H$_5$)$_2$ with =O | 0.2<br>0.02 | 65'<br>120' |
| (6) Structure: quinazoline-N-O-P(=S)(OCH(CH$_3$)$_2$)$_2$ with =O | 0.2<br>0.02 | 110'<br>240' |
| (7) Structure: quinazoline-N-O-P(=S)(OC$_2$H$_5$)(C$_2$H$_5$) with =O | 0.2<br>0.02<br>0.002 | 50'<br>185'<br>8 hrs = 90% |
| (8) Structure: quinazoline-N-O-P(=S)(OCH$_3$)(C$_2$H$_5$) with =O | 0.2<br>0.02 | 90'<br>240' |
| (9) Structure: quinazoline-N-O-P(=S)(CH$_3$)(OC$_2$H$_5$) with =O | 0.2<br>0.02<br>0.002 | 120'<br>165'<br>8 hrs = 80% |
| (2) Structure: quinazoline-N-O-P(=S)(CH$_3$)(OC$_3$H$_7$-i) with =O | 0.2<br>0.02<br>0.002<br>0.0002 | 110'<br>140'<br>200'<br>6 hrs = 40% |
| (11) Structure: quinazoline-N-O-P(=S)(OC$_2$H$_5$)(OC$_3$H$_7$-i) with =O | 0.2<br>0.02<br>0.002 | 95'<br>195'<br>6 hrs = 60% |
| (22) Structure: 6-Cl-quinazoline-N-O-P(=S)(OC$_2$H$_5$)$_2$ with =O | 0.2<br>0.02<br>0.002 | 45'<br>70'<br>6 hrs = 95% |

EXAMPLE 7

Test with parasitic fly larvae

Solvent: 35 parts by weight of ethylene glycol monoethyl ether

Emulsifier: 35 parts by weight of nonylphenol polyglycol ether

To prepare an appropriate preparation of active compound, 30 parts by weight of the active compound in question was mixed with the stated amount of solvent which contained the abovementioned proportion of emulsifier, and the concentrate thus obtained was diluted with water to the desired concentration.

About 20 fly larvae (*Lucilia cuprina*) were introduced into a test tube which contained a cottonwool plug which was impregnated with nutrient medium. 0.5 ml of the preparation of active compound was applied to this medium. After 24 hours, the degree of destruction in % was determined. Here, 100% denotes that all larvae were killed and 0% denotes that none of the larvae were killed.

The active compounds investigated, the concentrations tested and the results obtained can be seen from Table 7.

Table 7

(Test with parasitic fly larvae)

| Active compound | Active compound concentration in ppm | Degree of destruction in % (Lucilia cuprina) |
|---|---|---|
| (6) | 100 | 100 |
|  | 30 | 100 |
|  | 10 | 100 |
|  | 3 | 0 |
| (7) | 100 | 100 |
|  | 10 | 100 |
|  | 1 | 0 |
| (14) | 100 | 100 |
|  | 30 | 100 |
|  | 10 | 100 |
|  | 3 | 0 |
| (11) | 100 | 100 |
|  | 10 | 100 |
|  | 1 | <50 |

The following examples illustrate the synthesis of the compounds.

EXAMPLE 8

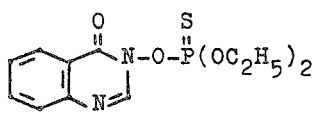 (1)

32.4 g (0.2 mole) of 3,4-dihydro-3-hydroxy-4-oxo-quinazoline (melting point 235° to 238°C; prepared by a process analogous to that of French Pat. Specification No. 1,373,006; compound described in A. Dornow, Ber. 99, (1966), pages 72 to 80) were added to a suspension of 500 ml of methyl ethyl ketone and 34.5 g (0.25 mol) of ground potassium carbonate. Thereafter the mixture was warmed to 50°C for 3 hours, while stirring. After cooling to room temperature, 36.4 g (0.2 mole) of O,O-diethyl-thionophosphoric acid ester chloride were added dropwise to the reaction mixture in such a way that the internal temperature did not exceed 30°C. Thereafter the batch was warmed to 70°C for 3 hours while stirring, the salt which had separated out was filtered off, the solvent was removed under reduced pressure and the solid residue was recrystallized from aqueous methanol. 36.3 g (57.8% of theory) of O,O-diethyl-O-[3,4-dihydro-4-oxo-quinazolin(3)-yl]-thionophosphoric acid ester were obtained in the form of colorless crystals of melting point 66°C.

EXAMPLE 9

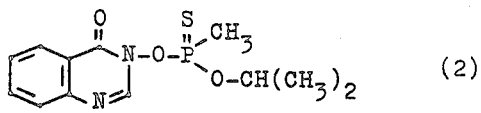 (2)

32.4 g (0.2 mole) of 3,4-dihydro-4-oxo-3-hydroxyquinazoline were warmed together with a suspension of 34.4 g (0.25 mole) of ground potassium carbonate in 500 ml of methyl isobutyl ketone to 50°C for 3 hours. After cooling to room temperature, 34.4 g (0.2 mole) of O-isopropyl-thionomethanephosphonic acid ester chloride were added dropwise to the reaction mixture in such a way that an internal temperature of 30°C was not exceeded. Thereafter the batch was warmed for 4 hours to 50°C while stirring. After cooling to room temperature, the reaction mixture was poured into water, the organic phase was washed until it gave a neutral reaction, and it was dried over sodium sulfate and the solvent stripped off under reduced pressure. The residue, which solidified on cooling, was recrystalllized from a little ethanol and 33.8 g (56.7% of theory) of O-isopropyl-O-[3,4-dihydro-4-oxo-quinazolin(3)-yl]-thionomethanephosphonic acid ester were obtained in the form of colorless crystals of melting point 67°C.

EXAMPLE 10

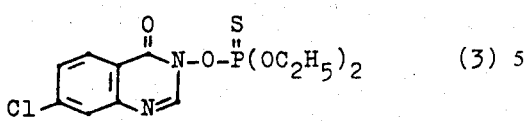

19.6 g (0.1 mole) of 7-chloro-3,4-dihydro-4-oxo-3-hydroxyquinazoline (melting point 210°C; preparation according to that of French Patent Specification 1,373,006) were added to a suspension of 14.2 g (0.103 mole) of ground potassium carbonate in 200 ml of methyl ethyl ketone. 18.8 g (0.103 mole) of O,O-diethylthionophosphoric acid ester chloride were then added dropwise to the mixture and the whole was warmed to 50°–60°C for 3 hours. 200 ml of benzene were subsequently added to the reaction mixture, which was washed with water and saturated sodium bicarbonate solution. After drying over sodium sulfate, the solvent was stripped off under reduced pressure and the residual crystalline product was recrystallized from ethanol. 20 g (57.5% of theory) of O,O-diethyl-O-[7-chloro-3,4-dihydro-4-oxo-quinazolin(3)-yl]-thionophosphoric acid ester were obtained in the form of colorless crystals of melting point 78°C.

The compounds of the following structure were prepared analogously to the above Examples 8–10:

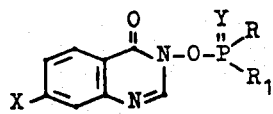

| Cpd. | R | $R_1$ | Y | X | Physical properties (melting point, refractive index) | Yield (% of theory) |
|---|---|---|---|---|---|---|
| 4 | $OCH_3$ | $-OCH_3$ | S | H | melting point 80°C | 77 |
| 5 | $N(CH_3)_2$ | $-N(CH_3)_2$ | O | H | melting point 138°C | 49 |
| 6 | $OCH(CH_3)_2$ | $-OCH(CH_3)_2$ | S | H | melting point 53°C | 87.7 |
| 7 | $OC_2H_5$ | $-C_2H_5$ | S | H | melting point 55°C | 58.7 |
| 8 | $OCH_3$ | $-C_2H_5$ | S | H | melting point 69°C | 89 |
| 9 | $OC_2H_5$ | $-CH_3$ | S | H | melting point 96°C | 30.2 |
| 10 | $OC_2H_5$ | $-C_6H_5$ | S | H | melting point 54°C | 66.5 |
| 11 | $OC_2H_5$ | $-OCH(CH_3)_2$ | S | H | $n_D^{25}=1.5417$ | 71.4 |
| 12 | $OCH_3$ | $-OCH_3$ | S | Cl | melting point 75°C | 25 |
| 13 | $OC_2H_5$ | $-C_2H_5$ | S | Cl | melting point 60°C | 72 |
| 14 | $OC_2H_5$ | $-NH-CH(CH_3)_2$ | S | H | melting point 39°C | 59.5 |
| 15 | $OC_2H_5$ | $-OCH(CH_3)_2$ | S | Cl | melting point 60°C | 60 |
| 16 | $OCH(CH_3)_2$ | $-CH_3$ | S | Cl | melting point 83°C | 12 |
| 17 | $OC_2H_5$ | $-SCH_3$ | S | H | melting point 62°C | 64 |
| 18 | $OC_2H_5$ | $-SC_3H_7$ | S | H | $n_D^{24}=1.5919$ | 50 |
| 19 | $OC_2H_5$ | $-SC_2H_5$ | S | H | melting point 37–38°C | 40 |

EXAMPLE 11

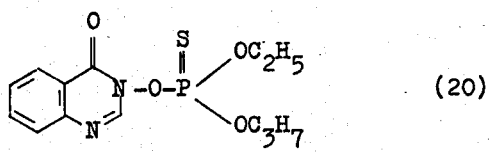

16.2 g (0.1 mole) of 3,4-dihydro-3-hydroxy-4-oxo-quinazoline were added to a suspension of 250 ml of methyl ethyl ketone and 17.3 g (0.125 mole) of ground potassium carbonate. Thereafter the mixture was warmed to 50°C for 3 hours. After cooling to room temperature, 20.25 g of O-ethyl-O-propyl-thionophosphoric acid ester chloride (prepared from O-propylthiono-phosphoric acid ester dichloride and ethanol in the presence of a tertiary base; boiling point at 2 mm Hg; 64°C; $n_D^{25}$ : 1.4671) were added dropwise to the reaction mixture. The mixture was then warmed to 60°C for 4 hours while stirring and after cooling to room temperature the batch was poured into water and the reaction product was subsequently extracted by shaking with methylene chloride. After drying over sodium sulfate, the methylene chloride solution was evaporated under reduced pressure and the residue was subjected to incipient distillation on a steam jet apparatus. 26.9 g (86.4% of theory) of O-ethyl-O-propyl-O [3,4-dihydro-4-oxo-quinazolin(3)-yl]-thionophosphoric acid ester were obtained as a yellow oil of refractive index $n_D^{24}$: 1.5540.

The compound of the following formula was obtained analogously to Example 11.

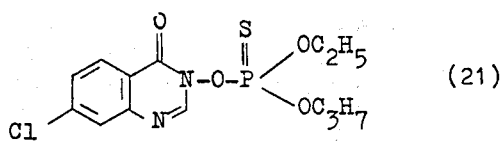

Yield: 62% of theory. Refractive index: $n_D^{26}$: 1.5606.
Other compounds which can be similarly prepared include:

O,O-dimethyl-O-[3,4-dihydro-4-oxo-6,7-dibromo-quinazolin(3)-yl]-phosphoric acid ester
O-ethyl-O-[3,4-dihydro-4-oxo-5,6,7,8-tetrachloro-quinazolin(3)-yl]-methanephosphonic acid ester
and the like.

It will be appreciated that the instant specification and examples are set forth by way of illustration and not limitation, and that various modifications and changes may be made without departing from the spirit and scope of the present invention.

What is claimed is:

1. A 3,4-dihydro-4-oxo-quinazolino(thiono)-phosphoric (phosphonic) acid ester of the formula

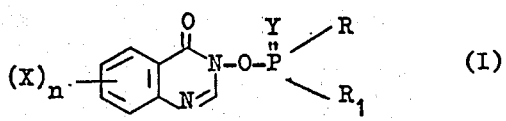

in which
R is alkoxy with 1 to 6 carbon atoms,
$R_1$ is alkyl, alkoxy or alkylmercapto with 1 to 6 carbon atoms, or phenyl,
X is hydrogen or halogen,
Y is oxygen or sulfur, and
n is an integer from 1 to 4.

2. A compound according to claim 1 in which R is alkoxy with 1 to 4 carbon atoms, $R_1$ is alkyl, alkoxy or alkylmercapto with 1 to 4 carbon atoms, or phenyl.

3. The compound according to claim 1 wherein such compound is O,O-diethyl-O-[3,4-dihydro-4-oxo-quinazolin(3)-yl]-thionophosphoric acid ester of the formula

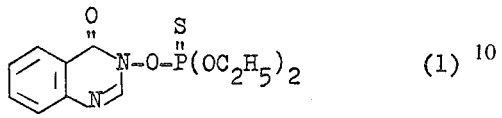   (1)

4. The compound according to claim 1 wherein such compound is O-isopropyl-O-[3,4-dihydro-4-oxo-quinazolin(3)-yl]-thionomethanephosphonic acid ester of the formula

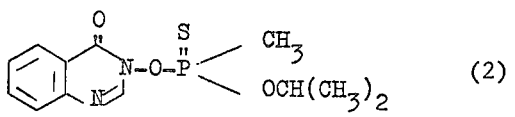   (2)

5. The compound according to claim 1 wherein such compound is O-ethyl-O-[3,4-dihydro-4-oxo-quinazolin(3)-yl]-thionoethanephosphonic acid ester of the formula

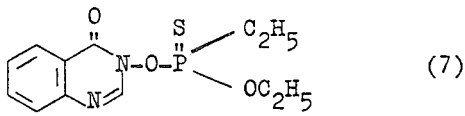   (7)

6. The compound according to claim 1 wherein such compound is O-ethyl-O-isopropyl-O-[3,4-dihydro-4-oxo-quinazolin(3)-yl]-thionophosphoric acid ester of the formula

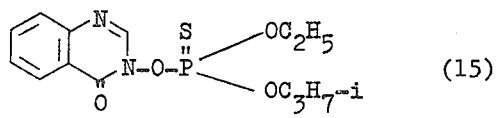   (15)

7. The compound according to claim 1 wherein such compound is O,O-diethyl-O-[3,4-dihydro-4-oxo-6-chloro-quinazolin(3)-yl]-thionophosphoric acid ester of the formula

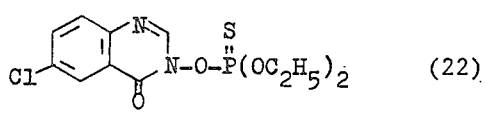   (22)

* * * * *